(12) United States Patent
Sathath et al.

(10) Patent No.: US 7,711,325 B2
(45) Date of Patent: May 4, 2010

(54) ELECTRONIC APPARATUS, COMPUTER SYSTEM, AND COMMUNICATION CONTROL METHOD

(75) Inventors: Anwar Sathath, Ome (JP); Koichi Kaji, Hidaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/413,300

(22) Filed: Mar. 27, 2009

(65) Prior Publication Data

US 2009/0247082 A1   Oct. 1, 2009

(30) Foreign Application Priority Data

Mar. 31, 2008   (JP)   .............................. 2008-091730

(51) Int. Cl.
*H04B 7/00* (2006.01)
(52) U.S. Cl. .................... 455/41.2; 455/41.3; 455/66.1; 455/68; 455/557; 375/220; 710/303
(58) Field of Classification Search ................ 455/41.2, 455/41.3, 66.1, 68, 90.3, 184.1, 434, 464, 455/509, 515, 557; 370/252, 395.5, 329; 375/220; 710/303
See application file for complete search history.

(56) References Cited

U.S. PATENT DOCUMENTS

| 2002/0038400 | A1 | 3/2002 | Fukushima |
| 2003/0100263 | A1 | 5/2003 | Tanaka et al. |
| 2006/0143310 | A1 | 6/2006 | Fukushima |

FOREIGN PATENT DOCUMENTS

| JP | 2002-108521 A | 4/2002 |
| JP | 2002-229673 A | 8/2002 |
| JP | 2002-319947 | 10/2002 |
| JP | 2003-309749 A | 10/2003 |
| JP | 2007-028590 A | 2/2007 |
| JP | 2007-194929 | 8/2007 |

OTHER PUBLICATIONS

Explanation of Non-English Language Reference(s).
An English Translation of Notification of Reasons for Rejection mailed by Japan Patent Office for Japanese Patent Application No. 2008-091730 on May 19, 2009.
Notification of Reasons for Rejection issued by JPO in the corresponding to the Japanese Patent Application No. 2008-091730 on May 12, 2009.

*Primary Examiner*—Matthew D Anderson
*Assistant Examiner*—Shaima Q Aminzay
(74) *Attorney, Agent, or Firm*—Knobbe, Martens, Olson & Bear LLP

(57) ABSTRACT

According to one embodiment, an electronic apparatus comprises a wireless communication device configured to conduct wireless communication with an external apparatus, a switch connected to a radio frequency circuit of the wireless communication device, and configured to couple an RF signal input and output port of the radio frequency circuit to one of a wireless communication antenna and a cable connected to the external apparatus, and a control module configured to control the switch to switch a mode of conducting communication with the external apparatus between a wireless communication mode and a wired communication mode, a wireless signal being transmitted and received between the external apparatus and the wireless communication device through the wireless communication antenna in the wireless communication mode, the wireless signal being transmitted and received between the external apparatus and the wireless communication device through the cable in the wired communication mode.

4 Claims, 12 Drawing Sheets

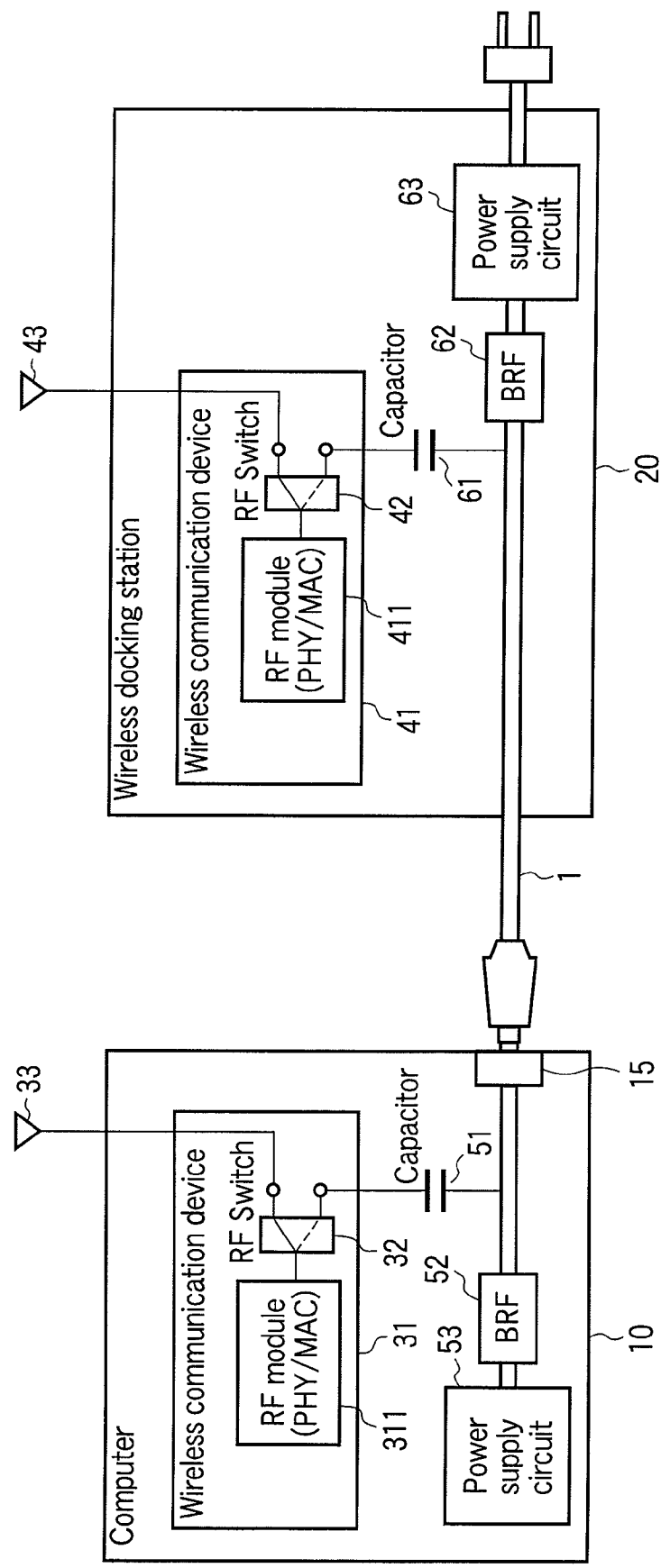
F I G. 2

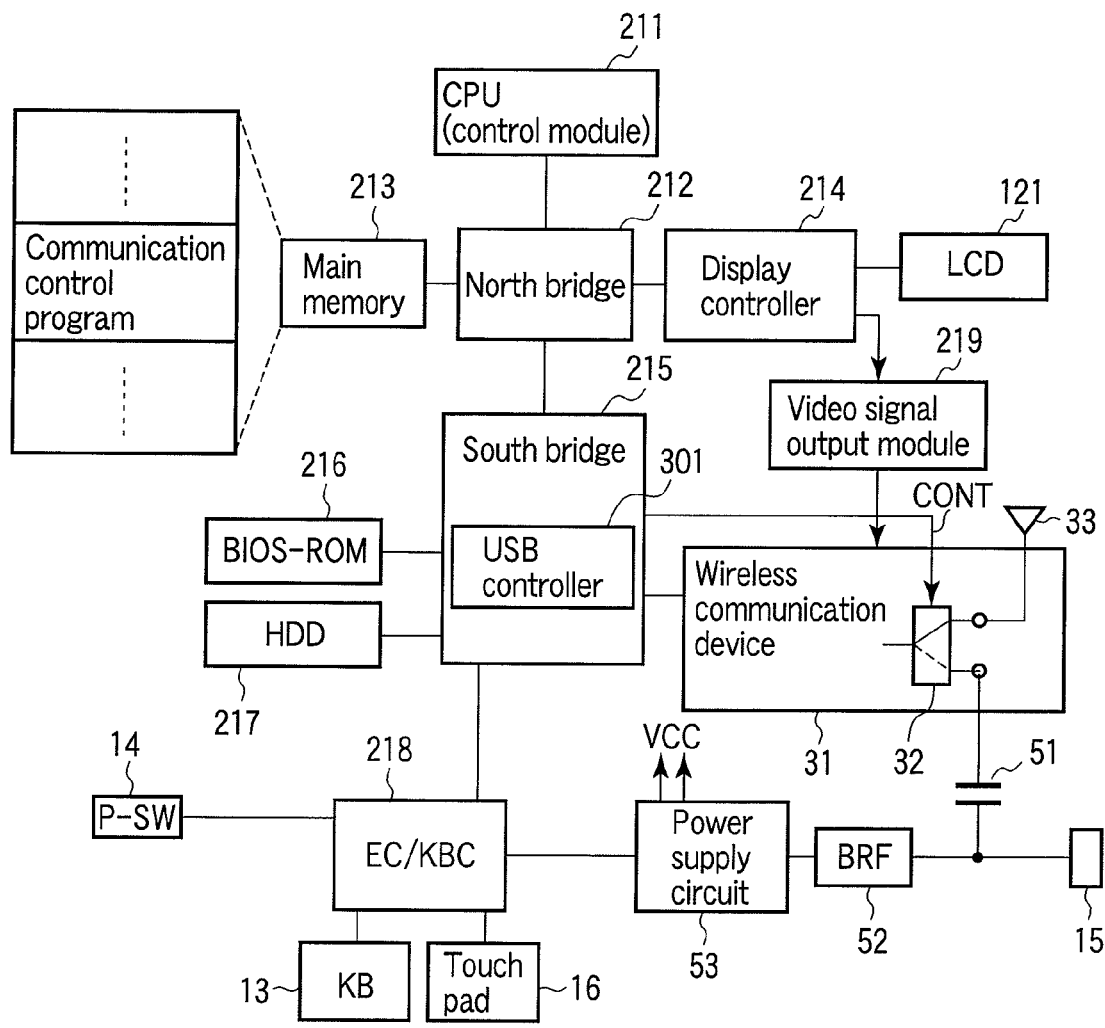
F I G. 3

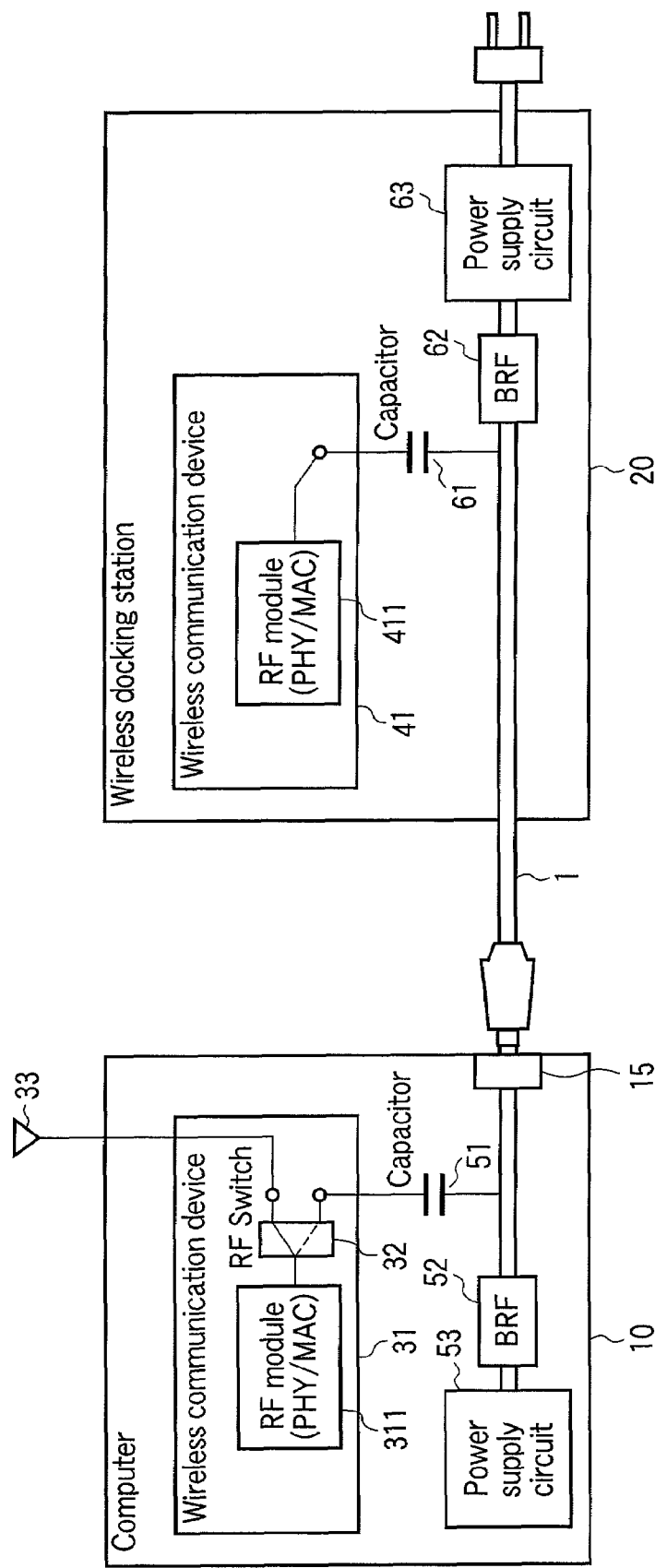
F I G. 10

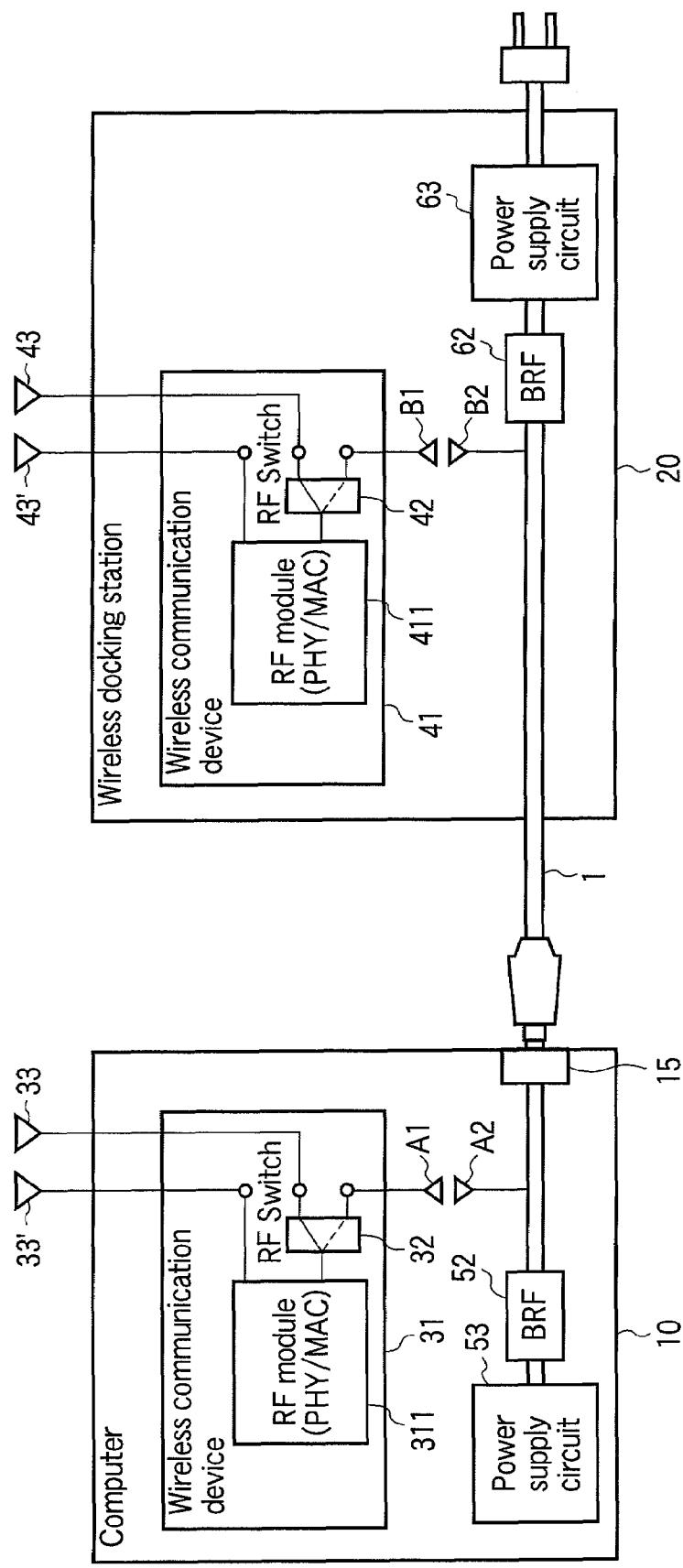
F I G. 12

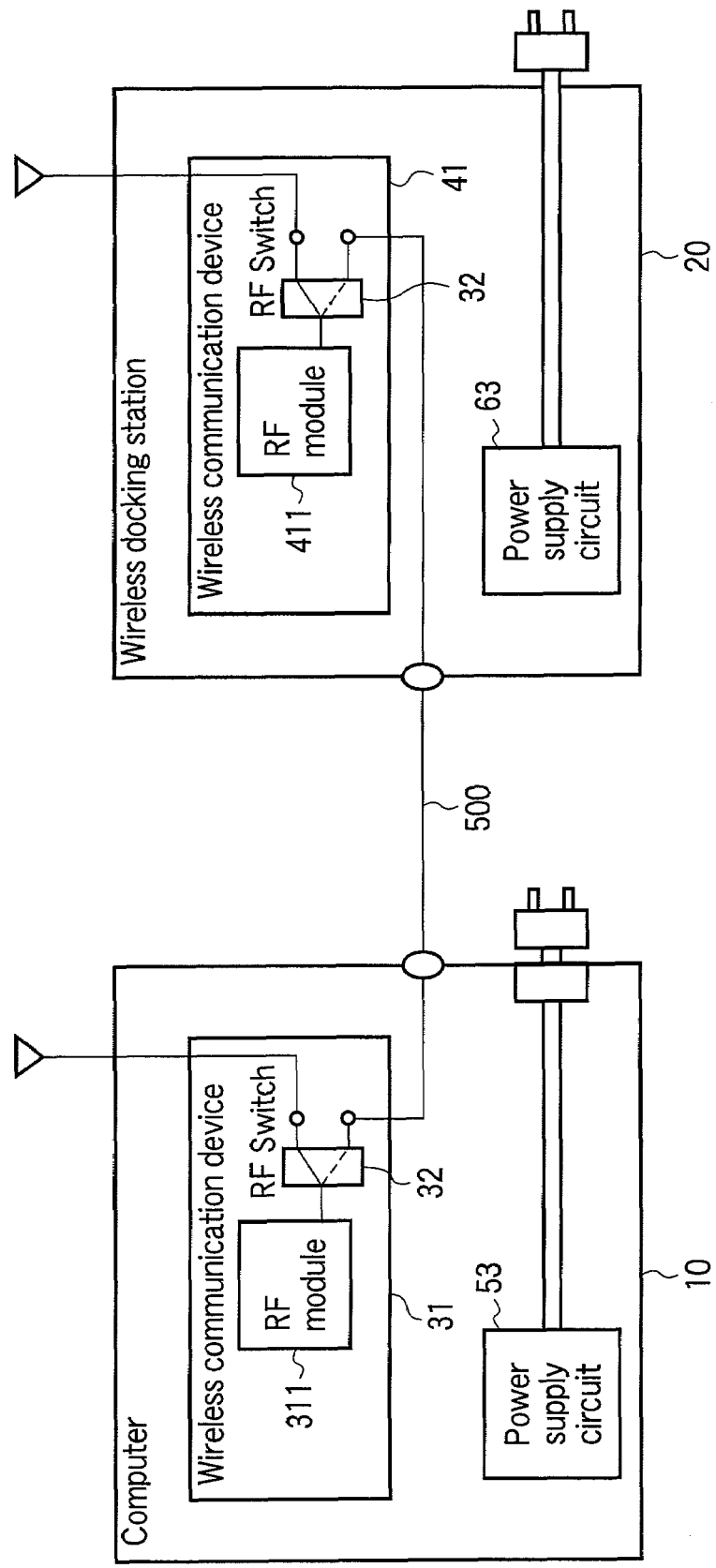
F I G. 13

ELECTRONIC APPARATUS, COMPUTER SYSTEM, AND COMMUNICATION CONTROL METHOD

CROSS-REFERENCE TO RELATED APPLICATIONS

This application is based upon and claims the benefit of priority from Japanese Patent Application No. 2008-091730, filed Mar. 31, 2008, the entire contents of which are incorporated herein by reference.

BACKGROUND

1. Field

One embodiment of the present invention relates to an electronic apparatus having a wireless communication function, a computer system, and a communication control method.

2. Description of the Related Art

Recently, there have been developed various portable personal computers such as a laptop personal computer and a notebook personal computer. An extension unit called a docking station is also developed as an external apparatus which extends a function of the portable personal computer.

For example, Jpn. Pat. Appln. KOKAI Publication No. 2002-108521 discloses a system including an extension unit and a computer. In the system, a wired LAN controller is incorporated in the extension unit, and a wireless communication unit is incorporated in the computer. The computer is wirelessly connected to an access point by the wireless communication unit in an undocked state, and the computer is connected to a network through the wired LAN controller in the extension unit in a docked state.

Jpn. Pat. Appln. KOKAI Publication No. 2003-309749 discloses a camera system including a digital camera and an extension unit. In the camera system, an electric power is supplied from the extension unit to the digital camera through a cable, and data communication is conducted between the extension unit and the digital camera through the cable.

However, both in the systems disclosed in Jpn. Pat. Appln. KOKAI Publication Nos. 2002-108521 and 2003-309749, the electronic apparatus such as the computer and the camera and the extension unit thereof are connected in a wired manner. The wired connection becomes a factor for losing portability of the electronic apparatus such as the computer and the camera or a factor for restricting a point of use of the electronic apparatus.

When a wireless connection is established between the electronic apparatus and the extension unit thereof, the functional extension of the electronic apparatus can be realized without losing the portability of the electronic apparatus. However, usually there is a limitation to the number of usable frequency channels in a short-range wireless communication system in which devices are wirelessly connected. Therefore, in the particular point of use such as an office, when some devices already conduct the wireless communication with the short-range wireless communication system, the unused frequency channel runs out to hardly start the new wireless communication. Even if the unused frequency channel exists, sometimes wireless communication cannot normally be conducted depending on the surrounding radio wave environment.

Accordingly, even if the wireless communication units for the short-range wireless communication are mounted on the electronic apparatus and the extension unit, the wireless communication cannot always be conducted between the electronic apparatus and the extension unit.

Therefore, even in a situation in which the wireless communication cannot be conducted, there is a need for realizing a new function of being able to conduct the communication between the electronic apparatus and the external apparatus such as the extension unit.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing an example of configurations of the electronic apparatus of the embodiment and an external apparatus when communication is conducted between the electronic apparatus and the external apparatus through a power cable;

FIG. 3 is an exemplary block diagram showing a system configuration of the electronic apparatus of the embodiment;

FIG. 10 is an exemplary block diagram showing still another example of the configurations of the electronic apparatus of the embodiment and the external apparatus when the communication is conducted between the electronic apparatus and the external apparatus through the power cable;

FIG. 12 is an exemplary block diagram showing still another example of the configurations of the electronic apparatus of the embodiment and the external apparatus when the communication is conducted between the electronic apparatus and the external apparatus through the power cable;

FIG. 13 is an exemplary block diagram showing an example of the configurations of the electronic apparatus of the embodiment and the external apparatus when the communication is conducted between the electronic apparatus and the external apparatus through a cable other than the power cable.

DETAILED DESCRIPTION

Various embodiments according to the invention will be described hereinafter with reference to the accompanying drawings. In general, according to one embodiment of the invention, an electronic apparatus comprises a wireless communication device, a switch, and a control module. The wireless communication device is configured to conduct wireless communication with an external apparatus. The switch is connected to a radio frequency circuit of the wireless communication device. The switch is configured to couple an RF signal input and output port of the radio frequency circuit to one of a wireless communication antenna and a cable connected to the external apparatus. The control module is configured to control the switch to switch a mode of conducting communication with the external apparatus between a wireless communication mode and a wired communication mode, a wireless signal being transmitted and received between the external apparatus and the wireless communication device through the wireless communication antenna in the wireless communication mode, the wireless signal being transmitted and received between the external apparatus and the wireless communication device through the cable in the wired communication mode.

Figure 1:
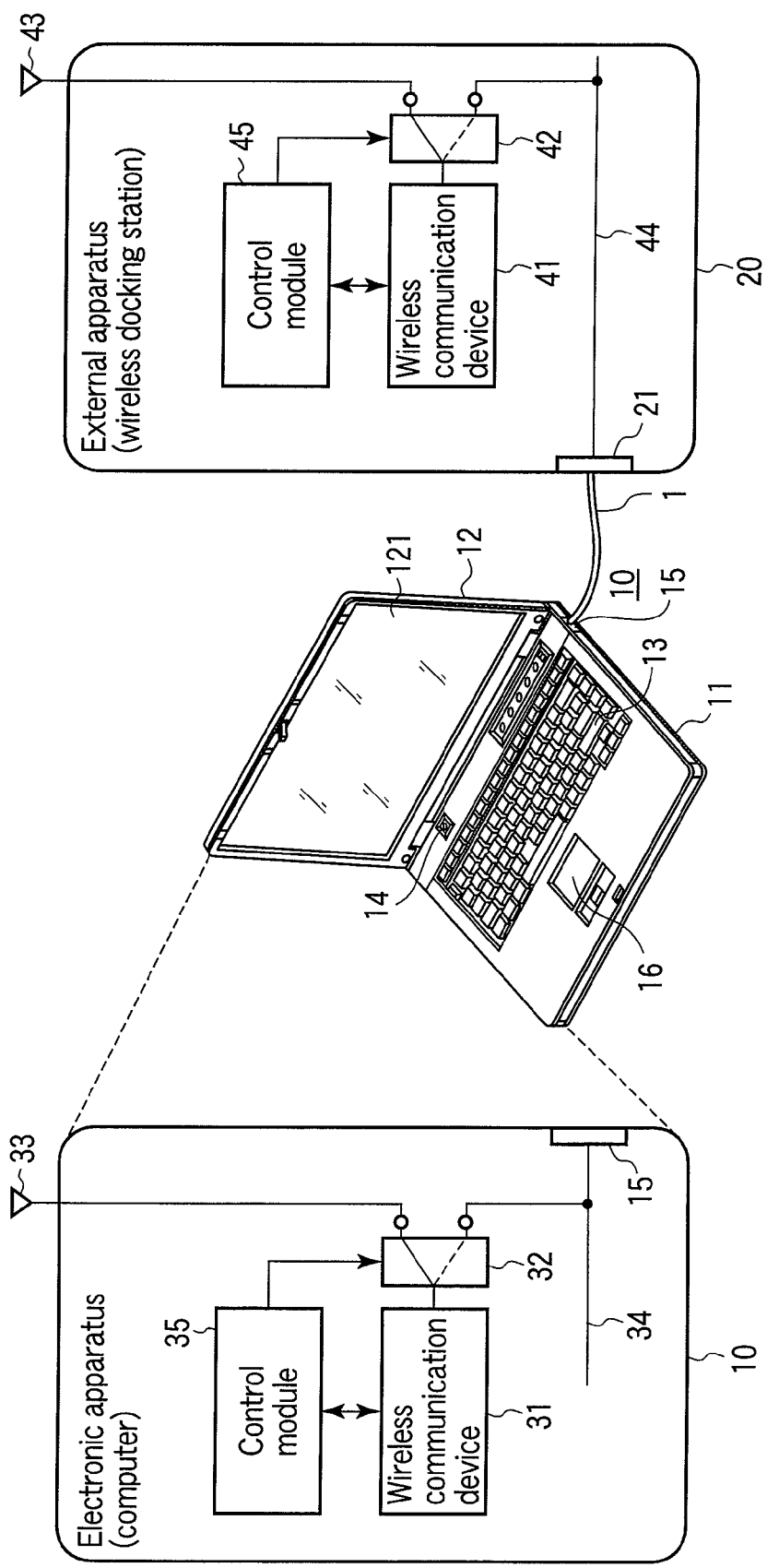
FIG. 1 is an exemplary block diagram showing a configuration of an electronic apparatus according to an embodiment of the invention.

A configuration of an electronic apparatus according to an embodiment of the invention will be described with reference to FIG. 1. For example, the electronic apparatus is realized as a computer 10. The computer 10 is a portable information processing apparatus such as a portable personal computer. The computer 10 includes a main body 11 and a display unit 12 which is attached to the main body 11. A liquid crystal display (LCD) 121 is incorporated in the display unit 12. A keyboard 13, a power button 14, and a touch pad 16 are disposed in a top surface of the main body 11.

The computer 10 has a function of conducting wireless communication with an external apparatus 20. The external apparatus 20 is realized as a wireless docking station which is an extension unit for extending the function of the computer 10. The computer 10 can wirelessly be connected to the external apparatus 20 to use various peripheral devices connected to the external apparatus 20. The computer 10 transmits a digital video signal such as a Digital Visual Interface (DVI) signal in a form of a wireless signal (radio frequency signal: RF signal) to the external apparatus 20, which allows a screen image to be displayed on a display device (DVI monitor device) connected to the external apparatus 20. The wireless communication between the computer 10 and the external apparatus 20 is conducted using Ultra-Wideband (UWB) which is a short-range wireless communication system faster than a wireless LAN.

14 frequency channels are defined in a UWB standard, and are allocated in a frequency band of about 3.1 to about 10.6 GHz. However, the usable frequency ranges are restricted according to a country and a district. For example, in Japan, the frequency band usable in the UWB communication ranges from 3.4 to 4.8 GHz, and three frequency channels allocated in the frequency band ranging from 3.4 to 4.8 GHz are usable. Accordingly, when the three frequency channels are already used in a site such as an office, because the unused frequency channel does not exist, the UWB communication cannot newly be started in the site.

The computer 10 of the embodiment has a hybrid wireless communication function of switching a mode of conducting the communication with the external apparatus 20 between a wireless communication mode and a wired communication mode in order to conduct the communication with the external apparatus 20 in a situation in which the unused frequency channel is in shortage or a situation in which the radio wave interference is generated. Usually wireless connection is used in the communication between the computer 10 and the external apparatus 20. However, the communication can be conducted between the computer 10 and the external apparatus 20 using wired connection, when the wireless connection cannot be used, or when a user desires the wired connection. In the embodiment, the same wireless signal (RF signal) is used in both the wireless communication mode and the wired communication mode. That is, in the wired communication mode, the wireless signal (RF signal) used in the wireless communication mode is transmitted through a cable 1 connecting the computer 10 and the external apparatus 20.

In order to realize the hybrid wireless communication function, the computer 10 includes a wireless communication device 31, a switch (RF switch) 32, a wireless communication antenna 33, a wired transmission line 34, and a control module 35.

Wireless communication device 31 conducts the wireless communication according to the short-range wireless communication system such as the UWB standard. Wireless communication device 31 conducts the wireless communication with the external apparatus 20 using a frequency channel selected from plural frequency channels (for example, three frequency channels). The user can previously specify the selection of the frequency channel to be used. Alternatively, an unused frequency channel is selected from the three frequency channels, and the frequency channel may be selected as the frequency channel to be used.

Wireless communication device 31 includes a radio frequency circuit (RF circuit) which transmits and receives the RF signal. Although usually a wireless signal input and output port (RF signal input and output port) of the radio frequency circuit is directly connected to the wireless communication antenna 33 provided in the computer 10, the RF switch 32 is connected to the RF signal input and output port of the radio frequency circuit in the embodiment.

The RF switch 32 is a switch circuit which couples the RF signal input and output port of the radio frequency circuit in wireless communication device 31 to one of the wireless communication antenna 33 and the cable 1 connected to the external apparatus 20. In the wireless communication mode, the RF switch 32 connects the RF signal input and output port of the radio frequency circuit to the wireless communication antenna 33. On the other hand, in the wired communication mode, the RF switch 32 connects the RF signal input and output port of the radio frequency circuit to a wired port. Specifically, a connector 15 to which the cable 1 is connected and the wired transmission line 34 connected to the connector 15 are provided in the computer 10, and the RF signal input and output port of the radio frequency circuit is connected to the cable 1 through the RF switch 32, wired transmission line 34, and connector 15 in the wired communication mode.

The control module 35 controls the RF switch 32 to switch the mode of conducting the communication with the external apparatus 20 between the wireless communication mode and the wired communication mode. In the wireless communication mode, the RF signal is transmitted and received between the external apparatus 20 and wireless communication device 31 through the wireless communication antenna 33. In the wired communication mode, the RF signal is transmitted and received between the external apparatus 20 and wireless communication device 31 through the cable 1.

When the unused frequency channel does not exist in the plural frequency channels, or when generation of radio wave interference is detected in a period during which the communication with the external apparatus 20 is conducted in the wireless communication mode, the control module 35 displays a message for prompting the user to connect the cable 1 to the computer 10 on a display screen of the LCD 121, that is, to connect the computer 10 and the external apparatus 20 through the cable 1. After the cable 1 is connected to the computer 10, the control module 35 controls the RF switch 31 to switch a destination port of the RF switch 31 from the wireless communication antenna 33 to the wired port, thereby setting the mode of conducting the communication with the external apparatus 20 to the wired communication mode.

In the case where the cable 1 is already connected to the computer 10, the processing for displaying the message is skipped to immediately switch the communication mode to the wired communication mode. Alternatively, a determination whether or not the cable 1 is connected to the computer 10 is made in starting the communication, and higher priority may be given to the wired communication mode than the wireless communication mode when the cable 1 is connected to the computer 10. The wireless communication mode can be used even if the cable 1 is connected to the computer 10. At this point, the user can select which of the wired communication mode and the wireless communication mode is used.

In the embodiment, the wired communication is conducted using the same RF signal (modulated wave) as that used in the wireless communication. Therefore, because wireless communication device 31 is commonly used in the wireless communication and the wired communication, it is not necessary to provide a new circuit dedicated to the wired communication, which allows cost reduction to be achieved. A transmission loss of the RF signal through the cable 1 ranges from about 10 dB to about 20 dB. On the other hand, the transmission loss of the RF signal in air ranges from about 10 dB to about 40 dB. Because the transmission loss of the RF signal through the cable 1 falls within the range of the transmission loss of the RF signal in air, wireless communication device 31 can normally conduct the communication with the external apparatus 20 only by performing the same modulation and demodulation operations in both the wired communication mode and the wireless communication mode.

A coaxial cable can be used as the cable 1. A power cable may be used as the cable 1. The power cable is a cable for supplying a power supplied from the external apparatus 20 to the computer 10. The use of the power cable eliminates the connector used to connect the cable dedicated to communication, which allows further cost reduction to be achieved.

Similarly to the computer 10, the external apparatus 20 has the hybrid wireless communication function. That is, the external apparatus 20 includes a wireless communication device 41, an RF switch 42, a wireless communication antenna 43, a wired transmission line 44, and a control module 45.

Similarly to wireless communication device 31 of the computer 10, wireless communication device 41 conducts the wireless communication according to the short-range wireless communication system such as the UWB standard. Wireless communication device 41 conducts the wireless communication with the computer 10 using a frequency channel selected from plural frequency channels (for example, three frequency channels). The user can previously specify the selection of the frequency channel to be used. Wireless communication device 41 can select and change the frequency channel to be used according to an instruction from the computer 10.

Wireless communication device 41 includes a radio frequency circuit (RF circuit) which transmits and receives the wireless signal (RF signal). Although usually a wireless signal input and output port (RF signal input and output port) of the radio frequency circuit is directly connected to the wireless communication antenna 43 provided in the external apparatus 20, the RF switch 42 is connected to the RF signal input and output port of the radio frequency circuit in the embodiment.

The RF switch 42 is a switch circuit which couples the RF signal input and output port of the radio frequency circuit in wireless communication device 41 to one of the wireless communication antenna 43 and the cable 1 derived from the external apparatus 20. In the wireless communication mode, the RF switch 42 connects the RF signal input and output port of the radio frequency circuit to the wireless communication antenna 43. On the other hand, in the wired communication mode, the RF switch 42 connects the RF signal input and output port of the radio frequency circuit to a wired port. Specifically, a connector 21 to which the cable 1 is connected and the wired transmission line 44 connected to the connector 21 are provided in the external apparatus 20, and the RF signal input and output port of the radio frequency circuit is connected to the cable 1 through the RF switch 42, wired transmission line 44, and connector 21 in the wired communication mode.

The control module 45 controls the RF switch 42 to switch the mode of conducting the communication with the computer 10 between the wireless communication mode and the wired communication mode. In the wireless communication mode, the RF signal is transmitted and received between the computer 10 and wireless communication device 41 through the wireless communication antenna 43. In the wired communication mode, the RF signal is transmitted and received between the computer 10 and wireless communication device 41 through the cable 1.

The control module 45 monitors a packet error rate in the currently-used communication mode, and the control module 45 controls the RF switch 42 to switch the communication mode to be used to another communication mode when the packet error rate exceeds a reference value. Therefore, the communication mode used in the external apparatus 20 can be switched according to the switching of the communication mode used in the computer 10.

FIG. 2 shows an example of configurations of the computer 10 and external apparatus 20 when the power cable is used as the cable 1.

The computer 10 includes a capacitor 51 and a filter (band rejection filter: BRF) 52. The RF switch 32 is coupled to the power line in the power cable 1 through the capacitor 51. Specifically, the RF switch 32 is connected to a power line in the computer 10, and the power line in the computer 10 is coupled to the power line in the power cable 1 through the connector 15. The capacitor 51 passes the signal component corresponding to the frequency band (for example, 3.1 to 5.2 GHz) of the RF signal transmitted and received by wireless communication device 31. The capacitor 51 has a function of superposing the RF signal transmitted from wireless communication device 31 on the power line in the power cable 1 and a function of extracting the RF signal from the power line in the power cable 1. The capacitor 51 can improve a frequency characteristic of the RF signal transmitted and received through the power cable 1.

The BRF 52 is a filter circuit which prevents the RF signal transmitted through the power cable 1 from coming in a power supply circuit 53 of the computer 10. The BRF 52 prevents the passage of the signal component corresponding to the frequency band (for example, 3.1 to 5.2 GHz) of the RF signal transmitted and received by wireless communication device 31. The BRF 52 can be formed by a pattern filter or a choke coil. The BRF 52 acts as a splitter in cooperation with the capacitor 51.

The power supply circuit 53 produces an operational power which should be supplied to each component in the computer 10 from the electric power supplied from the external apparatus 20 through the power cable 1.

Wireless communication device 31 is realized as a single independent wireless module, and an RF module 311 and the RF switch 32 are incorporated in the wireless module. The RF module 311 is the above-described radio frequency circuit, and the radio frequency circuit is formed by hardware (PHY) corresponding to a physical layer of UWB and hardware (MAC) corresponding to an MAC layer. An RF signal input and output port of the RF module 311 is connected to the RF switch 32 through signal wiring in wireless communication device 31.

The external apparatus 20 includes a capacitor 61 and a filter (BRF) 62. The RF switch 42 is coupled to the power line in the power cable 1 through the capacitor 61. Specifically, the RF switch 42 is connected to the power line in the external apparatus 20.

The capacitor 61 passes the signal component corresponding to the frequency band (for example, 3.1 to 5.2 GHz) of the RF signal transmitted and received by wireless communication device 41. The capacitor 61 has a function of superposing the RF signal transmitted from wireless communication device 41 on the power line in the power cable 1 and a function of extracting the RF signal from the power line in the power cable 1. The capacitor 61 can improve the frequency characteristic of the RF signal transmitted and received through the power cable 1.

The BRF 62 is a filter circuit which prevents the RF signal transmitted through the power cable 1 from coming in a power supply circuit 63 of the external apparatus 20. The BRF 62 prevents the passage of the signal component corresponding to the frequency band (for example, 3.1 to 5.2 GHz) of the RF signal transmitted and received by wireless communication device 41. The BRF 62 can be formed by a pattern filter or a choke coil. The BRF 62 functions as a splitter in cooperation with the capacitor 61.

The power supply circuit 63 produces, from an external power supply (AC power supply), power (DC power supply) which should be supplied to the computer 10 and an operational power (DC power supply) which should be supplied to each component in the external apparatus 20.

Wireless communication device 41 is realized as a single independent wireless module, and an RF module 411 and the RF switch 42 are incorporated in the wireless module. The RF module 411 is the above-described radio frequency circuit, and the radio frequency circuit is formed by the hardware (PHY) corresponding to the physical layer of UWB and the hardware (MAC) corresponding to the MAC layer. An RF signal input and output port of the RF module 411 is connected to the RF switch 42 through signal wiring in wireless communication device 41.

An example of a system configuration of the computer 10 will be described below with reference to FIG. 3. The system configuration of FIG. 3 corresponds to the case in which the power cable is used as the cable 1.

In addition to wireless communication device 31, RF switch 32, capacitor 51, filter 52, and power supply circuit 53, the computer 10 includes a CPU 211, a north bridge 212, a main memory 213, a display controller 214, a south bridge 215, a BIOS-ROM 216, a hard disk drive (HDD) 217 which is a nonvolatile storage device, an embedded controller/keyboard controller IC (EC/KBC) 218, and a video signal output module 219.

The CPU 211 is a processor which controls an operation of the computer 10, and executes an operating system (OS) and various application/utility programs which are loaded from the HDD 217 to the main memory 213. The application/utility program includes a communication control program. The communication control program is a program which controls wireless communication device 31. The CPU 211 executes the communication control program, whereby the CPU 211 acts functions the control module 35

The CPU 211 also executes a Basic Input/Output System (BIOS) stored in the BIOS-ROM 216. The BIOS is a program which controls hardware.

The north bridge 212 is a bridge device which connects a local bus of the CPU 211 and the south bridge 215. The north bridge 212 also has a function of conducting the communication with the display controller 214.

The display controller 214 is a graphics controller which controls the LCD 121 used as a display monitor of the computer 10. The display controller 214 produces a video signal for forming the screen image which should be displayed on the display screen of the LCD 124. The video signal produced by the display controller 214 is transmitted to the LCD 124. The display controller 214 can also transmit the video signal transmitted to the LCD 124 to the video signal output module 219.

The video signal output module 219 converts the video signal supplied from the display controller 214 into a digital video signal having a predetermined format such as a DVI format, and supplies the digital video signal to wireless communication device 31. The display controller 214 may have a function of controlling the digital video signal such as the DVI signal. In this case, the display controller 214 functions as a video signal output module which supplies the digital video signal.

The south bridge 215 is a bridge device which controls various I/O devices. A USB controller 301 is incorporated in the south bridge 215.

Wireless communication device 31 is connected to the south bridge 215. Under the control of the communication control program, wireless communication device 31 converts the USB signal supplied from the USB controller 301 into the signal (UWB signal) having a predetermined format such as a UWB format, and can transmit the wireless signal (that is, the RF signal modulated by the UWB signal) corresponding to the converted signal to the external apparatus 20. In the wireless communication mode, the wireless signal (RF signal) modulated by the UWB signal is transmitted to the external apparatus 20 through the wireless communication antenna 33. In the wired communication mode, the wireless signal (RF signal) modulated by the UWB signal is transmitted to the external apparatus 20 through the cable 1.

Wireless communication device 31 is also connected to the video signal output module 219. Wireless communication device 31 converts the digital video signal (DVI signal) supplied from the video signal output module 219 into the signal (UWB signal) having a predetermined format such as the UWB format, and can supply the wireless signal (that is, the RF signal modulated by the digital video signal) corresponding to the converted signal to the external apparatus 20. In the wireless communication mode, the wireless signal (RF signal) modulated by the digital video signal is transmitted to the external apparatus 20 through the wireless communication antenna 33. In the wired communication mode, the wireless signal (RF signal) modulated by the digital video signal is transmitted to the external apparatus 20 through the cable 1.

As described above, wireless communication device 31 is realized as the single independent wireless module, and the RF switch 32 can be mounted in the wireless module. For example, the RF switch 32 can be controlled through a general-purpose I/O (GPIO) port provided in wireless communication device 31. FIG. 3 shows an example in which the RF switch 32 is controlled by a control signal CONT supplied from the south bridge 215. Alternatively, the control signal CONT may be supplied from the EC/KBC 218 to the RF switch 32. Alternatively, the control signal CONT fed into the RF switch 32 is turned on and off in response to the user manipulation of a button switch provided in the computer 10, which allows the user to manually control the RF switch 32.

The EC/KBC 218 is a one-chip microcomputer into which an embedded controller managing the electric power and a keyboard controller controlling the keyboard (KB) 13 and the touch pad 16 are integrated.

Figure 4:
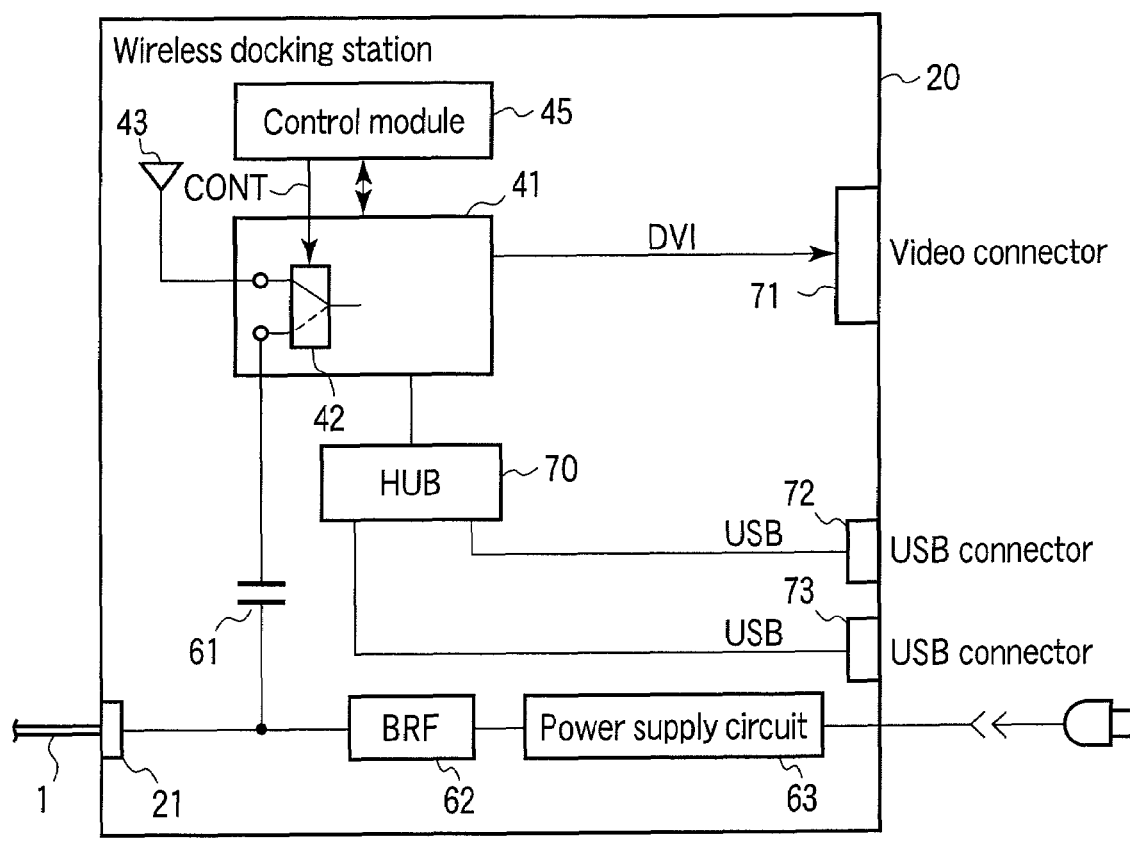
FIG. 4 is an exemplary block diagram showing a system configuration of an external apparatus which conducts communication with the electronic apparatus of the embodiment.

An example of a system configuration of the external apparatus 20 which functions as the wireless docking station (extension unit) will be described below with reference to FIG. 4. The system configuration of FIG. 4 corresponds to the case in which the power cable is used as the cable 1.

The external apparatus 20 includes a hub (HUB) 70, a video (DVI) connector 71, and USB connectors 72 and 73 in addition to wireless communication device 41, RF switch 42, capacitor 61, filter 62, and power supply circuit 63.

As described above, wireless communication device 41 is realized as the single independent wireless module, and the RF switch 42 can be mounted in the wireless module. For example, the RF switch 42 can be controlled through the general-purpose I/O (GPIO) port provided in wireless communication device 41. FIG. 4 shows an example in which the RF switch 42 is controlled by the control signal CONT supplied from the control module 45. Alternatively, the control signal CONT fed into the RF switch 42 is turned on and off in response to the manipulation of a button switch provided in the external apparatus 20, which allows the user to manually control the RF switch 42.

The video connector 71 is a connector which connects the external display device. The video connector 71 supplies the digital video signal received from the computer 10 by wireless communication device 41 to the external display device. There is no particular limitation to a format of the video signal supplied from the video connector 71. For example, when the needs for supplying an RGB signal from the video connector 71 arise, a circuit which converts the digital video signal received by wireless communication device 41 from the DVI signal into the RGB signal may be provided in front of the video connector 71.

Each of the USB connectors 72 and 73 is a connector which connects an external USB device. The USB connectors 72 and 73 are connected to wireless communication device 41 through the hub 70. The data transfer between the USB device connected to each of the USB connectors 72 and 73 and the USB controller 301 in the computer 10 is performed through data communication between wireless communication device 31 and wireless communication device 41.

Figure 5:
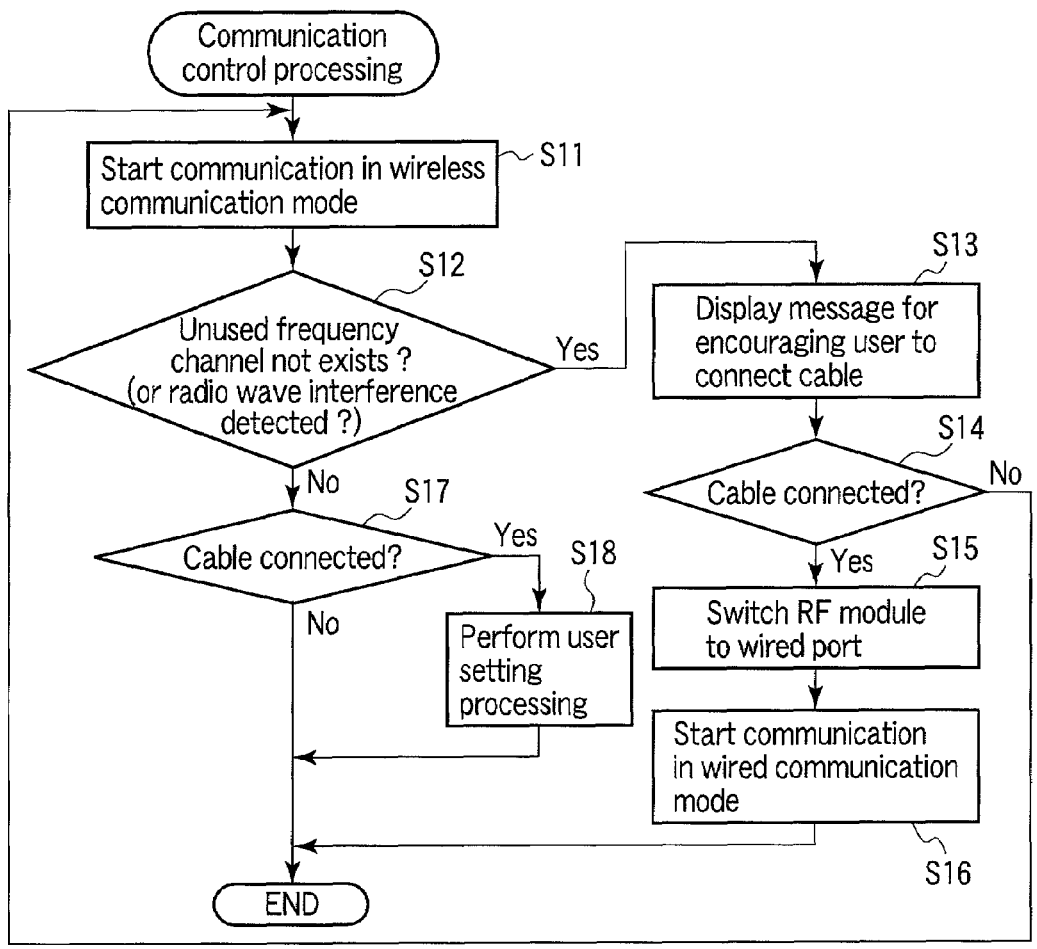
FIG. 5 is an exemplary flowchart showing a procedure of communication control processing performed by the electronic apparatus of the embodiment.

A procedure of communication control processing performed by the CPU 211 will be described below with reference to a flowchart of FIG. 5.

The CPU 211 starts the communication with the external apparatus 20 in the wireless communication mode (Step S11). In Step S11, the CPU 211 controls the RF switch 32 to connect the RF signal input and output port of the RF module 311 in wireless communication device 31 to the wireless antenna 33, thereby starting the wireless communication between wireless communication device 31 and the external apparatus 20.

The CPU 211 determines whether or not the unused frequency channel exists (Step S12). In Step S12, wireless communication device 31 scans each of the plural frequency channels, and the CPU 211 determines whether or not the unused frequency channel exists based on the scan result.

When the unused frequency channel does not exist (YES in Step S12), the CPU 211 displays the message for prompting the user to connect the computer 10 and the external apparatus 20 through the cable (for example, power cable) on the display screen of the LCD 121 (Step S13). The CPU 211 determines whether or not the cable 1 is connected to the computer 10 in cooperation with OS or BIOS (Step S14).

When the cable 1 is connected to the computer 10 (YES in Step S14), the CPU 211 controls the RF switch 32 to switch the RF module 311 of wireless communication device 31 to the wired port, thereby setting the mode of conducting the communication with the external apparatus 20 to the wired communication mode (Step S15). Therefore, wireless communication device 31 conducts the communication with the external apparatus 20 in the wired communication mode (Step S16). In Step S16, the wireless signal (RF signal) is transmitted and received between the computer 10 and the external apparatus 20 through the cable 1.

When the unused frequency channel exists (YES in Step S12), the CPU 211 determines whether or not the cable 1 is connected to the computer 10 in cooperation with OS or BIOS (Step S17). When the cable 1 is not connected to the computer 10 (NO in Step S17), the CPU 211 continuously conducts the communication in the wireless communication mode. On the other hand, when the cable 1 is connected to the computer 10 (YES in Step S17), the CPU 211 performs user setting processing for determining the communication mode to be used according to the user setting (Step S18).

Figure 6:
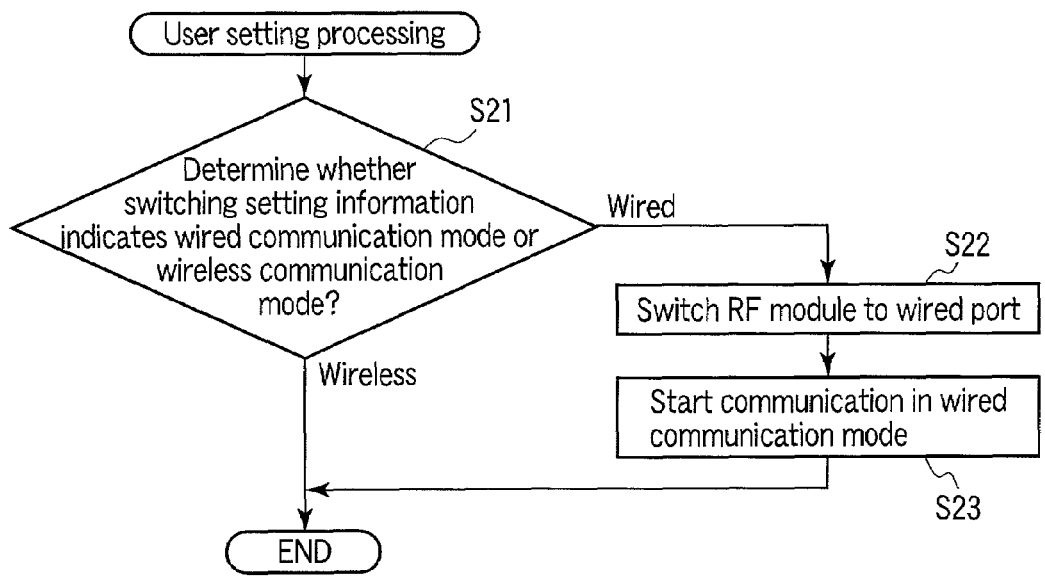
FIG. 6 is an exemplary flowchart showing a procedure of user setting processing performed by the electronic apparatus of the embodiment.

In Step S18, the CPU 211 refers to switching setting information indicating which of the wired communication mode and the wireless communication mode is given the higher priority, and determines the communication mode to be used. The switching setting information is previously specified by the user. Specifically, in Step S18, the CPU 211 performs a procedure shown in the flowchart of FIG. 6. The CPU 211 determines whether the switching setting information indicates the wired communication mode or the wireless communication mode (Step S21). When the switching setting information indicates the wireless communication mode, the CPU 211 continuously conducts the communication in the wireless communication mode. On the other hand, when the switching setting information indicates the wired communication mode, the CPU 211 controls the RF switch 32 to switch the RF module 311 of wireless communication device 31 to the wired port, thereby setting the mode of conducting the communication with the external apparatus 20 to the wired communication mode (Step S22). Therefore, wireless communication device 31 conducts the communication with the external apparatus 20 in the wired communication mode (Step S23). In Step S23, the RF signal is transmitted and received between the computer 10 and the external apparatus 20 through the cable 1.

In the period during which the communication with the external apparatus 20 is conducted in the wireless communication mode, the CPU 211 determines whether or not the radio wave interference is generated based on the packet error rate in Step S12. When the radio wave interference is generated (YES in Step S12), the CPU 211 performs the pieces of processing from the processing in Step S13 in order to switch the communication mode to the wired communication mode.

Figure 7:
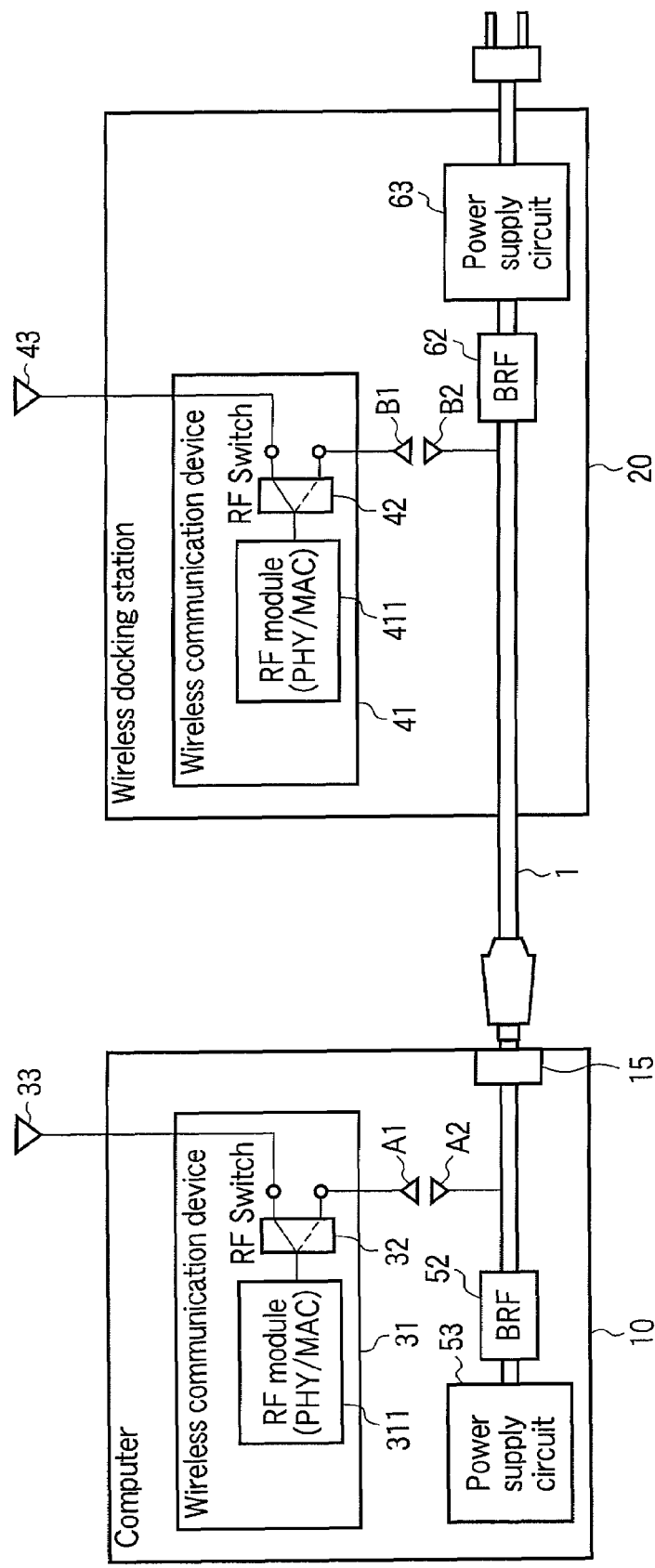
FIG. 7 is an exemplary block diagram showing another example of the configurations of the electronic apparatus of the embodiment and the external apparatus when the communication is conducted between the electronic apparatus and the external apparatus through the power cable.

FIG. 7 shows another example of the configurations of the computer 10 and the external apparatus 20 when the power cable is used as the cable 1.

Referring to FIG. 7, in the computer 10, the RF switch 32 is connected to the power line of the power cable 1 through first and second antennas A1 and A2 instead of the capacitor 51 of FIG. 2. The antennas A1 and A2 have the same frequency characteristic as the wireless communication antenna 33. For example, the antennas A1 and A2 cover the frequency band ranging from 3.1 to 5.2 GHz. The antennas A1 and A2 are used to superpose the RF signal transmitted from wireless communication device 31 on the power line in the power cable 1, and the antennas A1 and A2 are also used to extract the RF signal from the power line in the power cable 1. Using the antennas A1 and A2, the frequency characteristic of the RF signal transmitted and received through the power cable 1 can be equalized to the frequency characteristic of the RF signal transmitted and received through the wireless communication antenna 33.

In the embodiment, the antennas A1 and A2 are formed in a printed circuit board provided in the computer 10 in order not to allow the radio wave to leak to the outside, and in order to prevent mixing of a noise in other electronic components in the computer 10. In this case, the first antenna A1 and the second antenna A2 are formed in the printed circuit board provided in the computer 10, the second antenna A2 is separated from the first antenna A1, and the second antenna A2 is opposed to the first antenna A1. The RF switch 32 is connected to the first antenna A1 through a first connector on the printed circuit board. The second antenna A2 in the printed circuit board is connected to the power line in the power cable 1 through a second connector on the printed circuit board.

In the external apparatus 20, the RF switch 42 is connected to the power line of the power cable 1 through the first and second antennas B1 and B2 instead of the capacitor 61 of FIG. 2.

Figure 8:
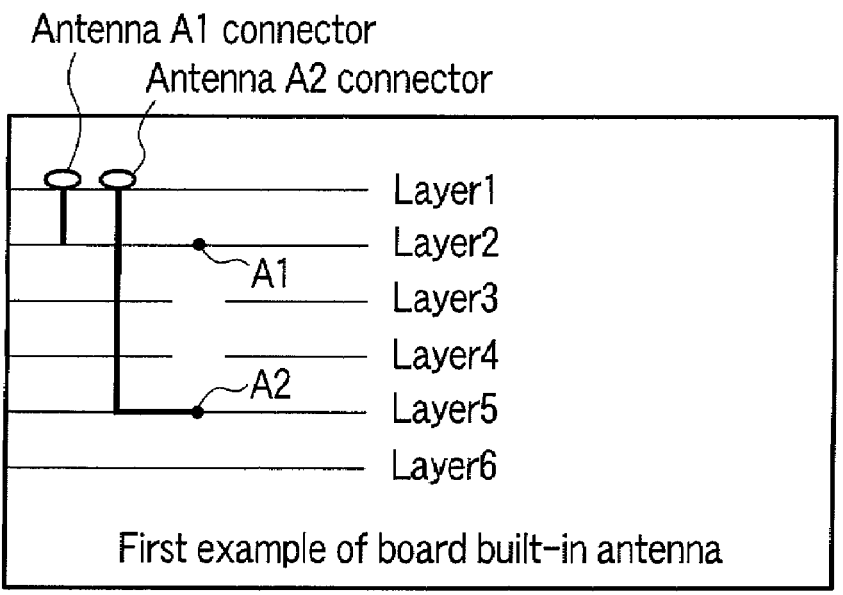
FIG. 8 shows an example of a configuration of a board built-in antenna used in the configuration of the electronic apparatus of FIG. 7.

FIG. 8 shows an example of a configuration of the antenna built-in printed circuit board provided in the computer 10.

The printed circuit board of FIG. 8 is a multilayer wiring board having plural wiring layers. The first connector (antenna A1 connector) connected to the first antenna A1 and the second connector (antenna A2 connector) connected to the second antenna A2 are provided in a wiring layer (layer 1) of the printed circuit board. The first antenna A1 is formed in an inner layer, for example, a layer 2, and the second antenna A2 is formed in another inner layer, for example, a layer 5. A through-hole (via hole) is made between the first antenna A1 and the second antenna A2, and the first antenna A1 and the second antenna A2 face each other through the through-hole.

Figure 9:
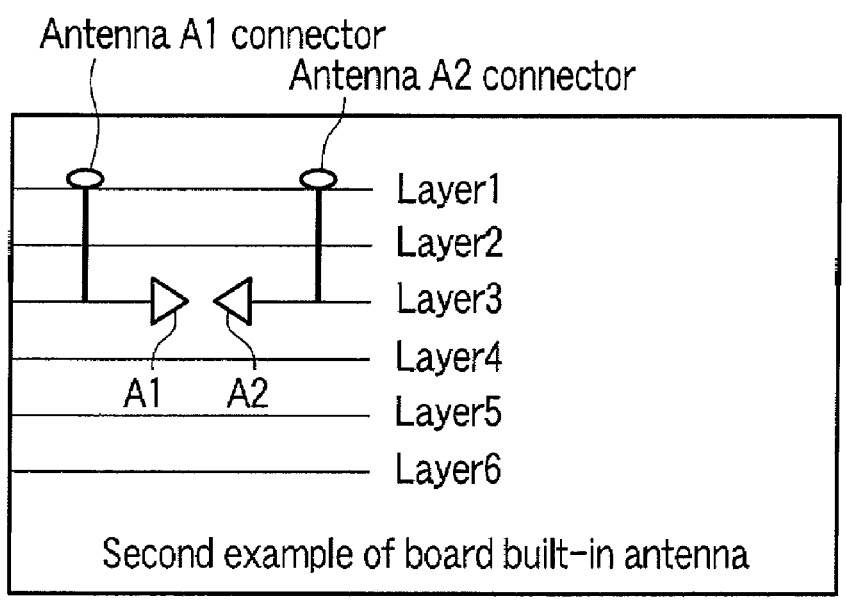
FIG. 9 shows another example of the configuration of the board built-in antenna used in the configuration of the electronic apparatus of FIG. 7.

FIG. 9 shows another example of the configuration of the antenna built-in printed circuit board provided in the computer 10.

The printed circuit board of FIG. 9 is a multilayer wiring board having plural wiring layers. The first connector (antenna A1 connector) connected to the first antenna A1 and the second connector (antenna A2 connector) connected to the second antenna A2 are provided in the wiring layer (layer 1) of the printed circuit board. The first antenna A1 is formed in an inner layer, for example, a layer 3, and the second antenna A2 is formed in the same inner layer, for example, the layer 3. The first antenna A1 and the second antenna A2 face each other.

As shown in FIGS. 8 and 9, antennas B1 and B2 of the external apparatus 20 can be incorporated in the printed circuit board.

FIG. 10 shows still another example of the configurations of the computer 10 and external apparatus 20 when the power cable is used as the cable 1.

Referring to FIG. 10, the computer 10 has the same configuration as that of FIG. 2, and the external apparatus 20 has a configuration which conforms to a destination where the use of the frequency band corresponding to the short-range wireless communication system such as UWB is prohibited. That is, in the external apparatus 20 of FIG. 10, the wireless communication antenna is not provided although wireless communication device 41 is mounted, and wireless communication device 41 always conducts the communication in the wired communication mode.

Figure 11:
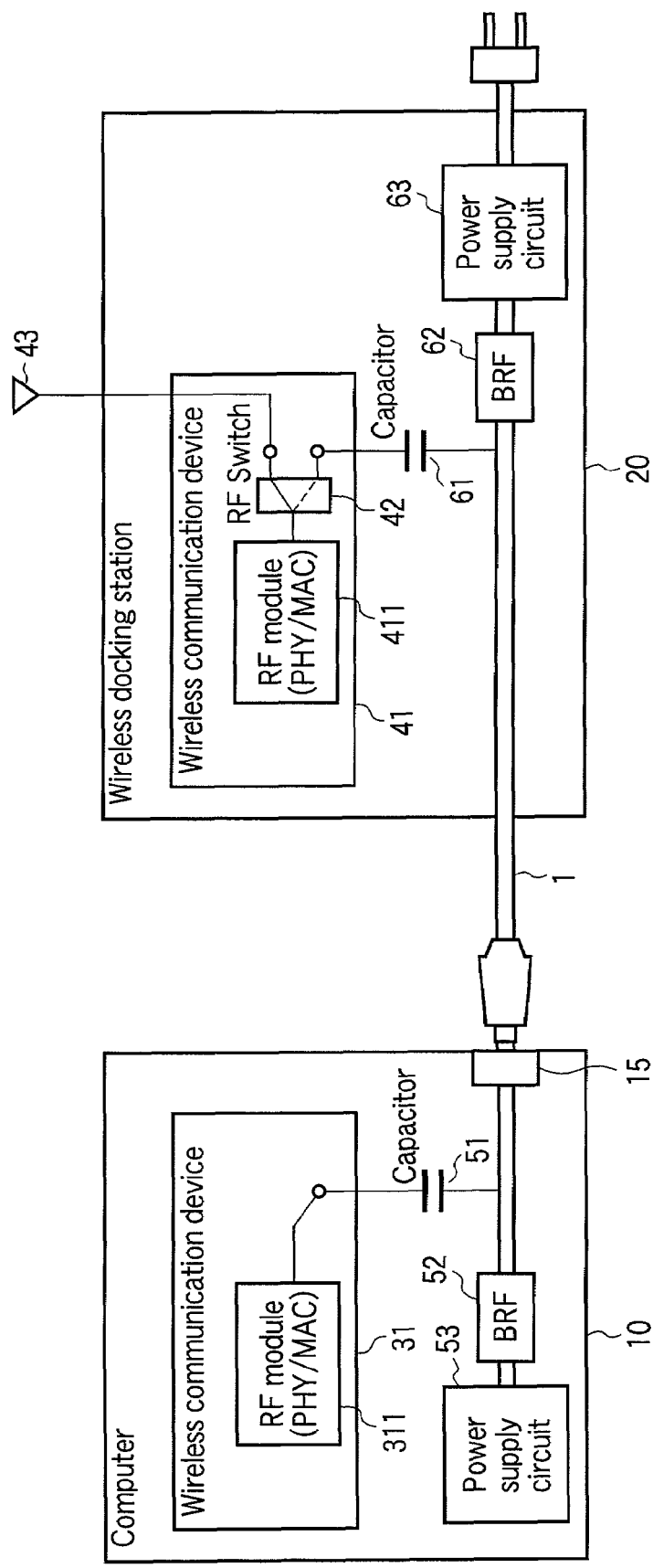
FIG. 11 is an exemplary block diagram showing still another example of the configurations of the electronic apparatus of the embodiment and the external apparatus when the communication is conducted between the electronic apparatus and the external apparatus through the power cable.

FIG. 11 shows still another example of the configurations of the computer 10 and external apparatus 20 when the power cable is used as the cable 1.

Referring to FIG. 11, the external apparatus 20 has the same configuration as that of FIG. 2, and the computer 10 has a configuration which conforms to the destination where the use of the frequency band corresponding to the short-range wireless communication system such as UWB is prohibited. That is, in the computer 10 of FIG. 11, the wireless communication antenna is not provided although wireless communication device 31 is mounted, and wireless communication device 31 always conducts the communication in the wired communication mode.

FIG. 12 shows still another example of the configurations of the computer 10 and external apparatus 20 when the power cable is used as the cable 1.

Two wireless communication antennas 33 and 33' are provided in the computer 10. In the wireless communication mode, the wireless communication antennas 33 and 33' function as a diversity antenna.

In the wired communication mode, the RF module 311 of wireless communication device 31 is connected to the power line of the power cable 1 through the RF switch 32, first antenna A1, and second antenna A2, and the RF module 311 transmits and receives the RF signal through the power cable 1.

Two wireless communication antennas 43 and 43' are also provided in the external apparatus 20. In the wireless communication mode, the wireless communication antennas 43 and 43' function as the diversity antenna.

In the wired communication mode, the RF module 411 of wireless communication device 41 is connected to the power line of the power cable 1 through the RF switch 42, first antenna B1, and second antenna B2, and the RF module 411 transmits and receives the RF signal through the power cable 1.

FIG. 13 shows an example of the configurations of the computer 10 and external apparatus 20 when a dedicated communication cable which is different from the power cable is used as the cable 1.

In FIG. 13, a cable 500 dedicated to communication is used in the wired communication mode. In the computer 10, the RF switch 32 is connected to the cable 500 in the wired communication mode. In the external apparatus 20, the RF switch 42 is connected to the cable 500 in the wired communication mode.

Figure 14:
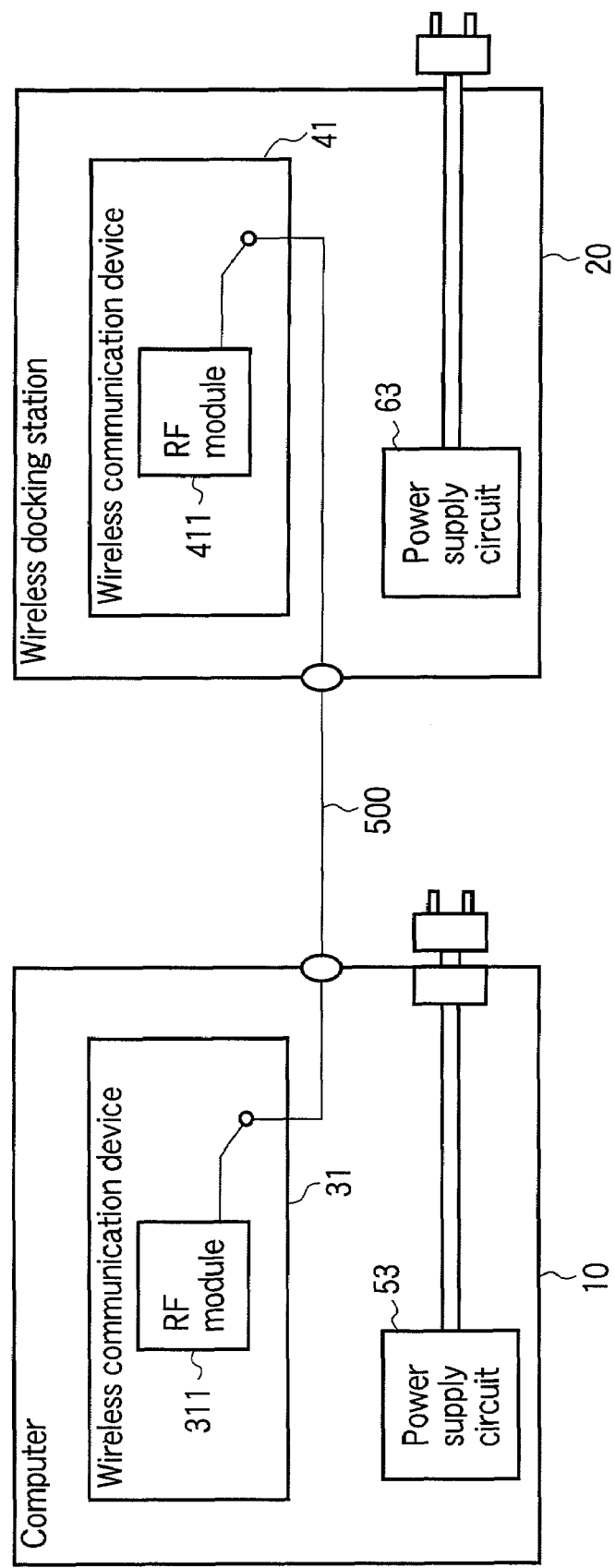
FIG. 14 is an exemplary block diagram showing another example of the configurations of the electronic apparatus of the embodiment and the external apparatus when the communication is conducted between the electronic apparatus and the external apparatus through a cable other than the power cable.

FIG. 14 shows another example of the configurations of the computer 10 and external apparatus 20 when the dedicated communication cable 500 which is different from the power cable is used as the cable 1.

Each of the computer 10 and the external apparatus 20 has a configuration which conforms to the destination where the use of the frequency band corresponding to the short-range wireless communication system such as UWB is prohibited. That is, in the computer 10 of FIG. 14, the wireless communication antenna is not provided although wireless communication device 31 is mounted, and wireless communication device 31 always conducts the communication in the wired communication mode. In the wired communication mode, wireless communication device 31 transmits and receives the RF signal through the cable 500.

In the external apparatus 20 of FIG. 14, the wireless communication antenna is not provided although wireless communication device 41 is mounted, and wireless communication device 41 always conducts the communication in the wired communication mode. In the wired communication mode, wireless communication device 41 transmits and receives the RF signal through the cable 500.

As described above, in the computer 10 of the embodiment, the switch (RF switch) 32 is provided in the output stage of wireless communication device 31, and the mode of conducting the communication with the external apparatus 20 can be switched between the wireless communication mode and the wired communication mode. In the wireless communication mode, the wireless signal (RF signal) is transmitted and received between the external apparatus 20 and wireless communication device 31 through the wireless communication antenna 33. In the wired communication mode, the wireless signal (RF signal) is transmitted and received between the external apparatus 20 and wireless communication device 31 through the cable 1 connecting the external apparatus 20 and the computer 10. Accordingly, even if the wireless communication cannot be conducted due to the shortage of the usable frequency channel or the radio wave interference, the communication with the external apparatus 20 can be conducted in the wired communication mode using the same RF signal as the wireless communication mode. Because wireless communication device 31 is commonly used in the wireless communication mode and the wired communication mode, the communication with the external apparatus 20 can be conducted without providing the circuit dedicated to the wired communication even in the situation in which the wireless communication cannot be conducted.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a wireless communication device configured to perform wireless communication with an external apparatus by use of a frequency channel selected from a plurality of frequency channels;
   a switch connected to a radio frequency circuit of the wireless communication device, and configured to couple an RF signal input and output port of the radio frequency circuit to one of a wireless communication antenna and a cable connected to the external apparatus; and
   a controller configured to control the switch in order to switch a communication mode for communication with the external apparatus between a wireless communication mode, in which wireless signals are transmitted and received between the external apparatus and the wireless communication device through the wireless communication antenna, and a wired communication mode, in which the signals are transmitted and received through the cable
   wherein:
   the controller is configured to display a message for prompting a user to connect the cable to the electronic apparatus on a display screen, and to control the switch to set the communication mode to the wired communication mode after the cable is connected to the electronic apparatus when there is no frequency channel available in the plurality of frequency channels, or when the interference of the radio wave is detected during the period of the communication with the external apparatus in the wireless communication mode.

2. An electronic apparatus of comprising:
   a wireless communication device configured to perform wireless communication with an external apparatus by use of a frequency channel selected from a plurality of frequency channels;
   a switch connected to a radio frequency circuit of the wireless communication device, and configured to couple an RF signal input and output port of the radio frequency circuit to one of a wireless communication antenna and a cable connected to the external apparatus;
   a controller configured to control the switch in order to switch a communication mode for communication with the external apparatus between a wireless communication mode, in which wireless signals are transmitted and received between the external apparatus and the wireless communication device through the wireless communication antenna, and a wired communication mode in which the signals are transmitted and received through the cable; and
   a printed circuit board configured to comprise a first antenna and a second antenna, the second antenna being separated from the first antenna and opposing to the first antenna,
   wherein the switch is connected to the first antenna, and the second antenna in the printed circuit board is connected to a power line inside of the power cable.

3. An extension unit configured to extend a function of an information processing apparatus, comprising:
   a wireless communication device configured to perform wireless communication with the information processing apparatus;
   a switch connected to a radio frequency circuit of the wireless communication device and configured to couple an RF signal input and output port of the radio frequency circuit to one of the wireless communication antenna and a power cable through which power to be output to the information processing apparatus is supplied;

a controller configured to control the switch in order to switch a communication mode for communication with the information processing apparatus between a wireless communication mode, in which wireless signals are transmitted and received between the information processing apparatus and the wireless communication device through the wireless communication antenna, and a wired communication mode, in which wireless signals are transmitted and received between the information processing apparatus and the wireless communication device through the power cable; and a printed circuit board containing a first antenna, and a second antenna separate from and opposed to the first antenna, wherein the switch is connected to the first antenna, and the second antenna in the printed circuit board is connected to a power line inside the power cable.

4. The extension unit of claim 3, wherein the control module is capable of transmitting signals, which are received from the information processing apparatus through the wireless communication performed by the wireless communication device, to another apparatus connected to the extension unit.

* * * * *